United States Patent
He et al.

(10) Patent No.: US 12,224,830 B2
(45) Date of Patent: Feb. 11, 2025

(54) CHANNEL STATE INFORMATION FEEDBACK IN WIRELESS COMMUNICATIONS

(71) Applicant: Apple Inc., Cupertino, CA (US)

(72) Inventors: Hong He, San Jose, CA (US); Chunhai Yao, Beijing (CN); Dawei Zhang, Saratoga, CA (US); Haitong Sun, Cupertino, CA (US); Jie Cui, San Jose, CA (US); Wei Zeng, Saratoga, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 17/593,489

(22) PCT Filed: Apr. 8, 2020

(86) PCT No.: PCT/CN2020/083766
§ 371 (c)(1),
(2) Date: Sep. 20, 2021

(87) PCT Pub. No.: WO2021/203298
PCT Pub. Date: Oct. 14, 2021

(65) Prior Publication Data
US 2022/0311491 A1    Sep. 29, 2022

(51) Int. Cl.
*H04L 5/00* (2006.01)
*H04B 7/06* (2006.01)
(Continued)

(52) U.S. Cl.
CPC .......... *H04B 7/0626* (2013.01); *H04L 5/0048* (2013.01); *H04L 5/0053* (2013.01); *H04W 74/006* (2013.01); *H04W 74/0808* (2013.01)

(58) Field of Classification Search
CPC ... H04L 5/0053; H04L 5/0048; H04L 1/1896; H04W 74/006; H04B 7/0626
See application file for complete search history.

(56) References Cited

U.S. PATENT DOCUMENTS

2019/0165846 A1    5/2019   Kim et al.
2019/0174466 A1    6/2019   Zhang et al.
(Continued)

FOREIGN PATENT DOCUMENTS

CN    110771197    5/2019
CN    110071788    7/2019
(Continued)

OTHER PUBLICATIONS

Qualcomm Incorporated, "DL signals and channels for NR-U", 3GPP TSG RAN WG1 Meeting #98bis; R1-1912936; Nov. 22, 2019; 16 sheets.

*Primary Examiner* — Anez C Ebrahim
(74) *Attorney, Agent, or Firm* — Fay Kaplun & Marcin, LLP (57) ABSTRACT

Embodiments include a computer readable storage medium, a user equipment, a method and an integrated circuit that perform operations. The operations include receiving a downlink channel information (DCI) format 2_0 from a g-NodeB (gNB) connected to the 5G NR network, wherein the DCI format 2_0 includes channel occupancy time (COT) duration and a gap threshold value, determining if a nonzero power channel state information reference signal (NZP-CSI-RS) resource is valid, wherein the NZP-CSI-RS resource is valid if the NZP-CSI-RS resource is within the COT duration and if a gap between a last symbol of the DCI format 2_0 and a first symbol of the NZP-CSI-RS resource is greater than the gap threshold value.

20 Claims, 7 Drawing Sheets

(51) Int. Cl.
    *H04W 74/00*     (2009.01)
    *H04W 74/0808*   (2024.01)

(56) References Cited

U.S. PATENT DOCUMENTS

| | | | |
|---|---|---|---|
| 2019/0349960 A1 | 11/2019 | Li | |
| 2021/0409178 A1* | 12/2021 | Faxér | H04W 72/0446 |
| 2022/0338262 A1* | 10/2022 | He | H04W 48/16 |
| 2023/0188286 A1* | 6/2023 | Yokomakura | H04L 5/0051 |
| | | | 370/329 |

FOREIGN PATENT DOCUMENTS

| | | |
|---|---|---|
| IN | 201917031388 | 9/2019 |
| WO | 2019/157762 | 8/2019 |
| WO | 2019/160720 | 8/2019 |
| WO | 2020/066853 | 4/2020 |

\* cited by examiner

CHANNEL STATE INFORMATION FEEDBACK IN WIRELESS COMMUNICATIONS

BACKGROUND

A user equipment (UE) may establish a connection to at least one of a plurality of different networks or types of networks. When establishing the network connection such as, for example, a connection to a 5G new radio (NR) network, the UE may connect to the network through an unlicensed band of spectrum.

For NR unlicensed operation (NR-U), access to the channels of the unlicensed band is subject to regulatory requirements. Specifically, listen before talk (LBT) is a mandated procedure to meet these regulations. The LBT procedure is a mechanism by which a device applies a clear channel assessment (CCA) check before using a channel.

SUMMARY

Some exemplary embodiments include a computer readable storage medium comprising a set of instructions. The set of instructions when executed by a processor of a user equipment (UE) connected to a 5G new radio (NR) network on a frequency band in an unlicensed spectrum cause the processor to perform operations. The operations include receiving a downlink channel information (DCI) format 2_0 from a g-NodeB (gNB) connected to the 5G NR network, wherein the DCI format 2_0 includes channel occupancy time (COT) duration and a gap threshold value; determining if a nonzero power channel state information reference signal (NZP-CSI-RS) resource is valid, wherein the NZP-CSI-RS resource is valid if the NZP-CSI-RS resource is within the COT duration and if a gap between a last symbol of the DCI format 2_0 and a first symbol of the NZP-CSI-RS resource is greater than the gap threshold value.

Other exemplary embodiments include a user equipment (UE) connected to a 5G new radio (NR) network on a frequency band in an unlicensed spectrum. The UE includes a processor configured to: receive a downlink channel information (DCI) format 2_0 from a g-nodeB (gNB) connected to the 5G NR network, wherein the DCI format 2_0 includes channel occupancy time (COT) duration and a gap threshold value; determine if a nonzero power channel state information reference signal (NZP-CSI-RS) resource is valid, wherein the NZP-CSI-RS resource is valid if the NZP-CSI-RS resource is within the COT duration and if a gap between a last symbol of the DCI format 2_0 and a first symbol of the NZP-CSI-RS resource is greater than the gap threshold value.

DETAILED DESCRIPTION

The exemplary embodiments may be further understood with reference to the following description and the related appended drawings, wherein like elements are provided with the same reference numerals. The exemplary embodiments relate to a user equipment (UE) sending UCI information to a next generation Node B (gNB) of a 5G new radio (NR) network over an unlicensed (NR-U) band of spectrum. The exemplary embodiments advantageously allow for efficient aperiodic channel state information-reference signal (CSI-RS) transmission and CSI feedback from the UE to a gNB of a 5G new radio (NR) network over an unlicensed band of spectrum (NR-U).

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio NR radio access technology (RAT). However, in some embodiments, the network may also include a Long-Term Evolution (LTE) RAT even though the following description will focus primarily on 5G NR RAT. Although the UE can communicate with the network over both licensed and unlicensed bands of the spectrum, the following description will focus primarily on NR-U communications between the UE and the network.

A first issue with conventional aperiodic CSI feedback from a UE to a gNB is the delay caused by failed listen-before-talk (LBT) processes. If a CSI-RS transmission and measured CSI feedback are dependent on the outcome of the LBT process, there is a likelihood that the UE will fail to transmit the CSI report depending on the LBT outcome even if the UE successfully receives the CSI-RS from the gNB and conducts the CSI measurement. As a result, the gNB will need to trigger additional aperiodic CSI-RS transmission(s) and acquire the CSI report from the UE via additional physical uplink shared channel (PUSCH) resources. This causes inefficient downlink (DL) resource utilization of the unlicensed band and unnecessarily increases channel contention within this band.

According to some exemplary embodiments, the UE may perform a CSI-RS and CSI-interference measurement (CSI-IM) resource validation before determining the CSI measurement and transmitting the CSI report to the gNB. Specifically, the UE will conduct the CSI measurement when it determines that a non-zero power CSI-RS (NZP-CSI-RS) or CSI-IM resource is valid. This validity can be based on one or more predetermined factors. In other exemplary embodiments, the UE may determine whether or not a wideband (WB) CSI-RS or CSI-IM, which spans multiple LBT bandwidths, is available.

Another issue with conventional aperiodic CSI feedback from a UE to a gNB is that even if the gNB successfully transmits the downlink channel information (DCI) format that triggers aperiodic CSI-RS to the UE, a failed LBT may prevent the gNB from transmitting the associated CSI-RS to the UE. As a result, the power expended at the UE to compute the CSI information (e.g., perform the CSI measurement) is wasted.

According to some embodiments of the disclosure, the UE may perform an aperiodic CSI report retransmission after a failed LBT when the gNB triggers a retransmission or autonomously in the case of a configured grant PUSCH (CG-PUSCH).

Figure 1:
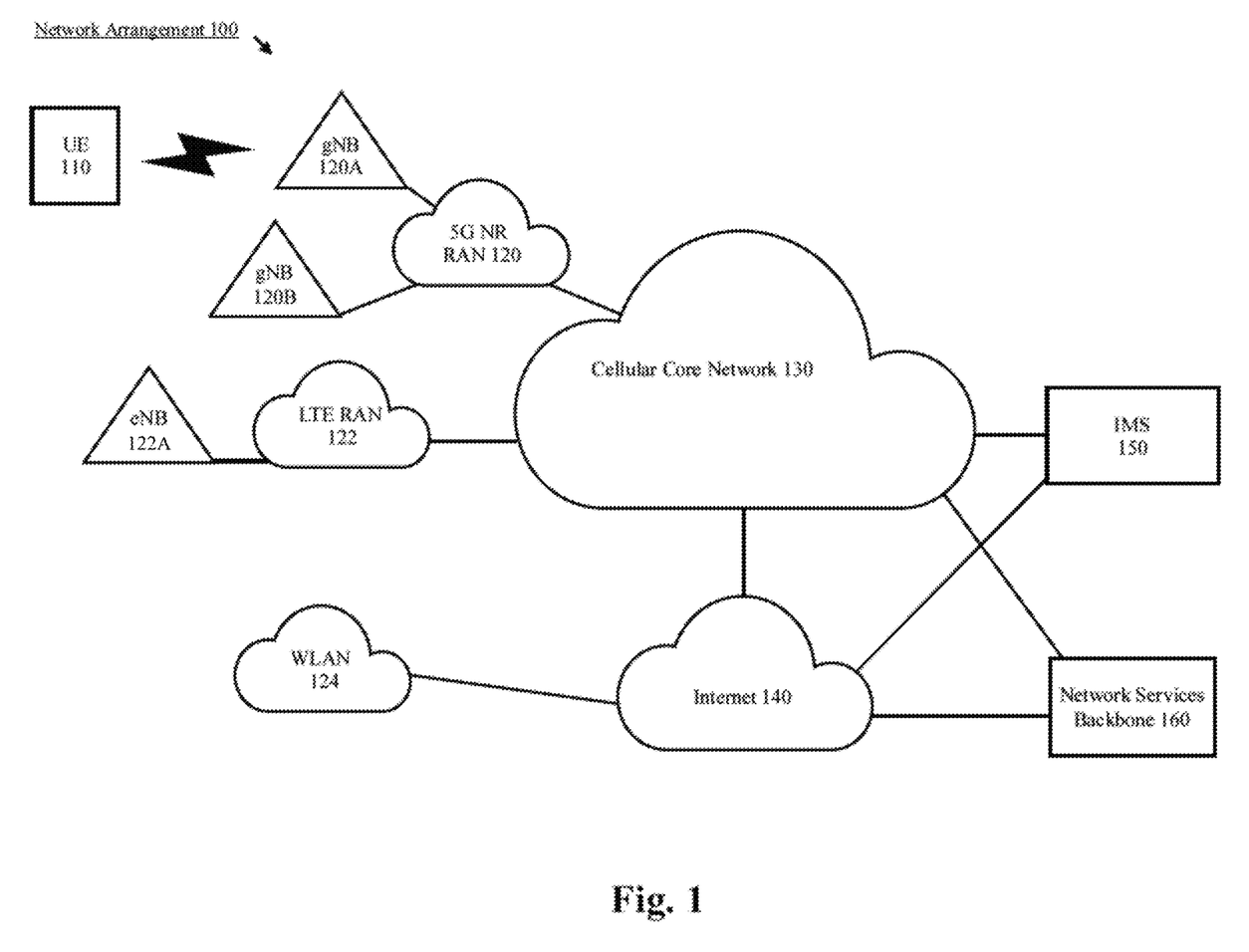
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UE 110 may be within range of a plurality of gNBs. Thus, either simultaneously or alternatively, the UE 110 may also connect to the 5G NR-RAN 120 via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
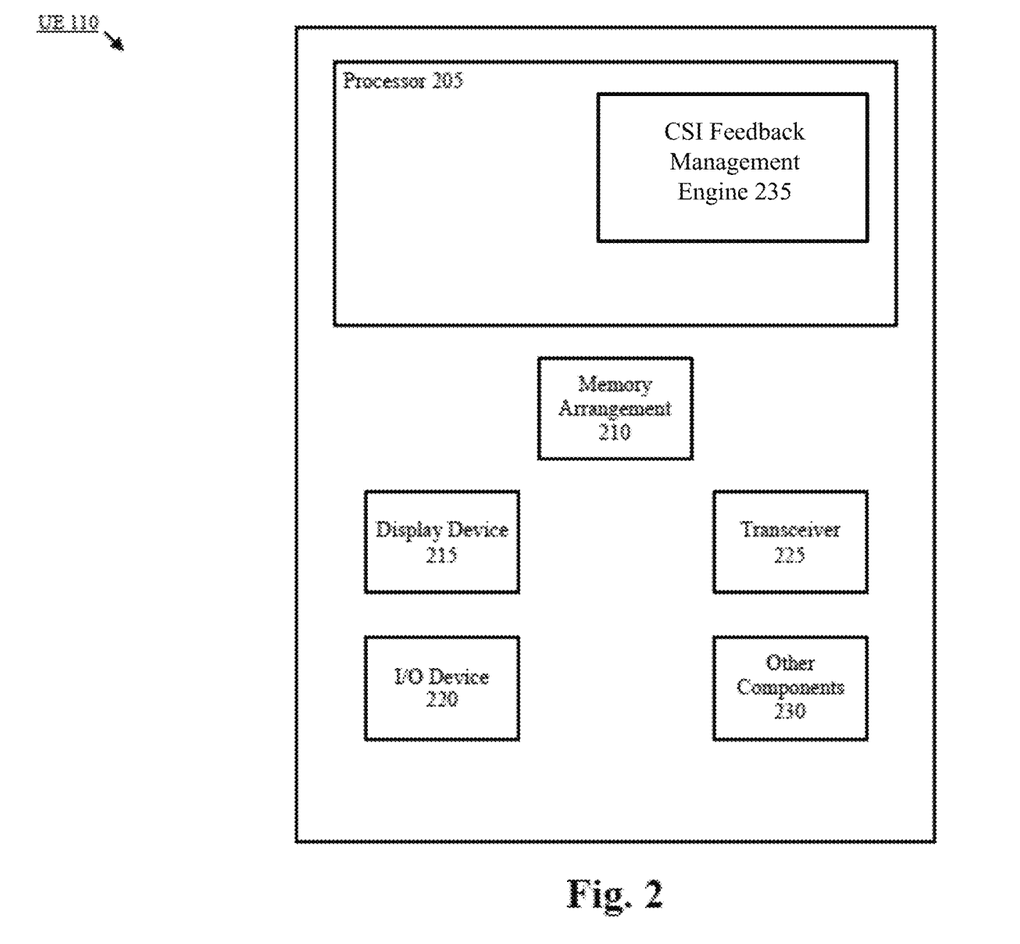
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc.

The processor 205 may be configured to execute a plurality of engines of the UE 110. For example, the engines may include a CSI feedback management engine 235. The CSI feedback management engine 235 may perform various operations related to taking CSI measurements and providing CSI feedback to one of the gNBs 120A, 120B over an unlicensed band of spectrum.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
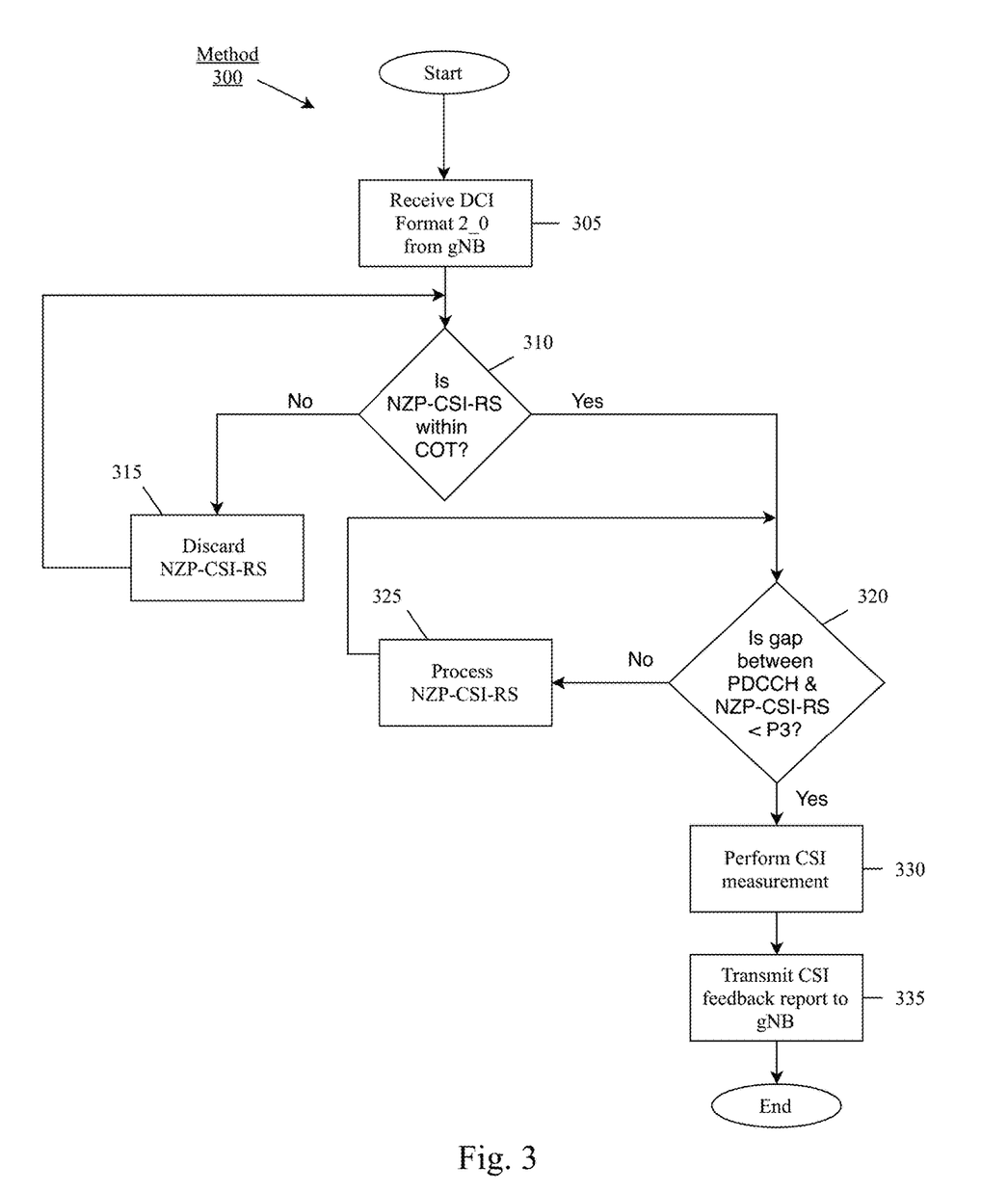
FIG. 3 shows a method of providing CSI feedback to a gNB according to various exemplary embodiments.

FIG. 3 shows a method 300 of providing CSI feedback to a gNB (e.g., 120A in the following description) according to various exemplary embodiments. Prior to the UE performing the method 300, the gNB 122A conducts a downlink (DL) LBT. Assuming the LBT succeeds, at 305, the UE 110 receives a DCI Format 2_0 from the gNB 120A. The UE 110 may be monitoring the physical downlink control channel (PDCCH) for reception of the DCI Format 2_0. In some embodiments, the DCI Format 2_0 may include a channel occupancy time (COT) duration indicator and/or a slot form indicator information element (IE). In some embodiments, the information carried by the DCI Format 2_0 may include a cyclic redundancy check (CRC) and is scrambled by a slot format indicator radio network (SFI-RNTI).

At 310, the UE 110 determines if an upcoming NZP-CSI-RS resource is within the COT defined in the DCI Format 2_0. If the NZP-CSI-RS is not within the COT, that NZP-CSI-RS is considered invalid by the UE at 315 and the UE returns to 310 to determine if the next NZP-CSI-RS is within the COT. If, at 310, the UE 110 determines that the NZP-CSI-RS is within the COT, the UE 110 next determines, at 320, whether a gap between the end of the PDCCH that conveys the DCI Format 2_0 for the COT duration indication and the beginning symbol of the NZP-CSI-RS is less than a predetermined value P3. In some exemplary embodiments, the predetermined value P3 of the gap may be defined in a specification (e.g., 3GPP Standards) based on the subcarrier spacing corresponding to the PDCCH with DCI Format 2_0.

If the gap is less than P3, the UE 110 considers that NZP-CSI-RS to be invalid at 325. If the gap is greater than P3, the UE 110 performs the CSI measurement at 330 and transmits the CSI feedback report to the gNB 122A at 335. In some embodiments, the UE 110 may rate match data around the NZP-CSI-RS resources configured by dedicated radio resource control (RRC) signaling if the scheduled physical downlink shared channel (PDSCH) transmission overlaps with the NZP-CSI-RS regardless of whether or not the NZP-CSI-RS is within the COT to ensure robustness of PDSCH decoding at the gNB 122A.

Figure 4:
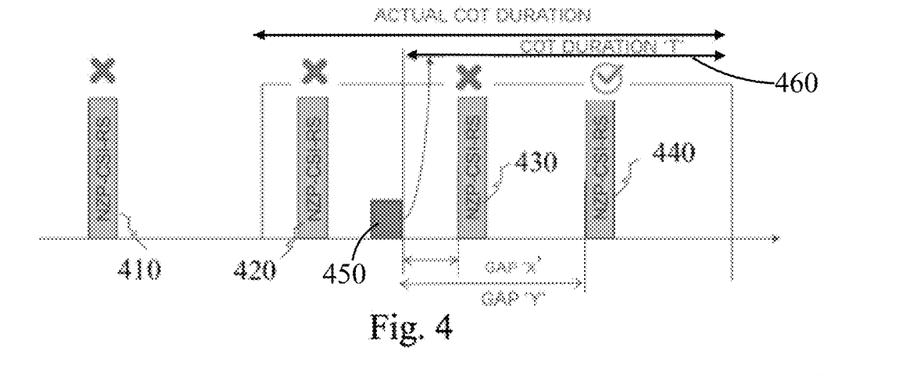
FIG. 4 shows a diagram illustrating periodic or semi-persistent NZP-CSI-RS validation according to various exemplary embodiments.

FIG. 4 shows a diagram illustrating periodic or semi-persistent NZP-CSI-RS validation according to various exemplary embodiments. In the example shown in FIG. 4, four NZP-CSI-RS resources 410, 420, 430, and 440 exist in the given observation window. A DL LBT process succeeds at the gNB 122A between NZP-CSI-RS 410 and 420. However, the first PDCCH monitoring occasion 450 for the DCI Format 2_0 is between the NZP-CSI-RS 420 and 430. The DCI Format 2_0 indicates a COT duration 460 with T symbols beginning at the ending symbol of the PDCCH.

Per the method 300 discussed above, the UE 110 validates the NZP-CSI-RS resources. For example, in the scenario illustrated in FIG. 4, the NSP-CSI-RS resources 410 and 420 are considered invalid because they are both outside of the COT indicated in the DCI Format 2_0. Although the NZP-CSI-RS resource 430 is within this COT, the gap X between the ending symbol of the PDCCH and the beginning symbol of the NZP-CSI-RS 430 is less than P3. As such, the UE determines that the NZP-CSI-RS 430 is also invalid. The NZP-CSI-RS 440 is the only one of the resources that is valid because it falls within the COT duration and a gap Y between the ending symbol of the PDCCH and the first symbol of the NZP-CSI-RS 440 is greater than P3.

Figure 5A:
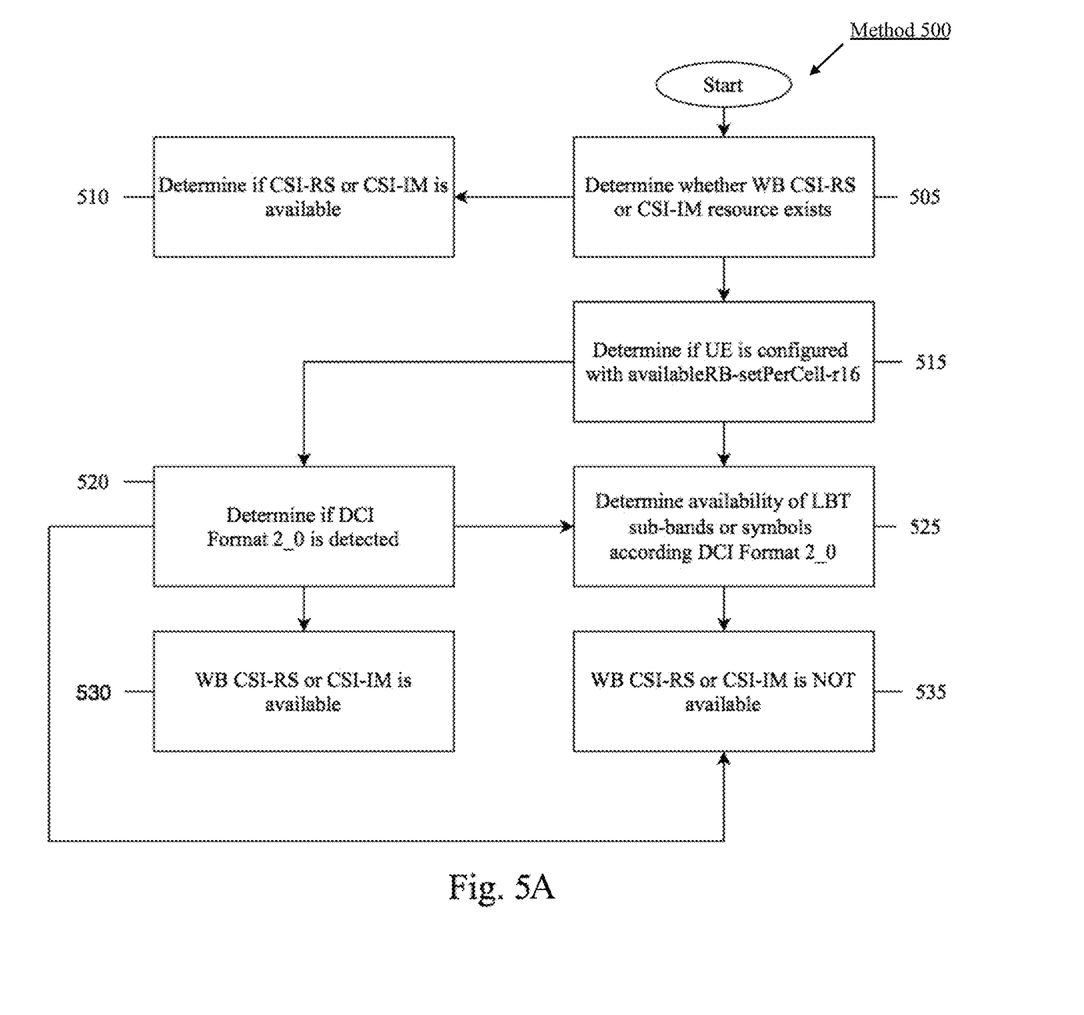
FIG. 5A shows method of determining the availability of wideband CSI-RS or CSI-IM according to various exemplary embodiments.

FIG. 5A shows a method 500 of determining the availability of wideband (WB) CSI-RS or CSI-IM according to various exemplary embodiments. WB CSI-RS or CSI-IM may be considered to span multiple LBT bands. For example, wideband frequencies may be 80 MHz with four 20 MHz LBT sub-bands. At 505, the UE determines whether a WB CSI-RS or CSI-IM resource exists. If not, then at 510, the UE 110 determines if a CSI-RS or CSI-IM is available. In some embodiments, a CSI-RS or CSI-IM is available if it is within the bandwidth of the DCI Format 2_0 and the CSI-RS or CSI-IM may be processed in accordance with the exemplary embodiments described herein or any other manners of processing these signals. Otherwise, the CSI-RS or CSI-IM is not available and the method is complete.

If the UE 110 determines that a WB CSI-RS or CSI-IM is available, then at 515, the UE may determine if the UE is configured with availableRB-setPerCell-r16 for DCI Format 2_0. Those skilled in the art will undertstand that this parameter indicates a location of a bitmap in DCI format 2_0 having a one-to-one mapping with a set of RB sets of the serving cell. Based on this determination, the UE will either proceed to 520 if the UE is not configured with availableRB-setPerCell-r16 or 525 if the UE is configured with availableRB-setPerCell-r16.

At 520, the UE determines if DCI Format 2_0 is detected and whether: (1) the corresponding symbols of the PDCCH are indicated as downlink or flexible by the DCI Format 2_0; or (2) the bandwidth of the CSI-RS or CSI-IM resource is within the LBT sub-band. If the DCI Format 2_0 is detected but neither (1) nor (2) are true, then the UE 110 determines that the WB CSI-RS or CSI-IM is considered not available for reception at 535. If the DCI Format 2_0 is detected and either (1) or (2) are true, then the UE 110 determines that the WB CSI-RS or CSI-IM is considered available for reception at 530.

At 525, the UE 110 determines the availability of LBT sub-bands or symbols corresponding to the detected DCI Format 2_0. If the UE 110 determines that the LBT sub-bands or symbols are not available, then the UE 110 determines that the WB CSI-RS or CSI-IM is considered not available for reception at 535. If the UE 110 determines that LBT sub-bands or symbols are available, then the UE 110 determines that the WB CSI-RS or CSI-IM is considered available for reception at 530.

Figure 5B:
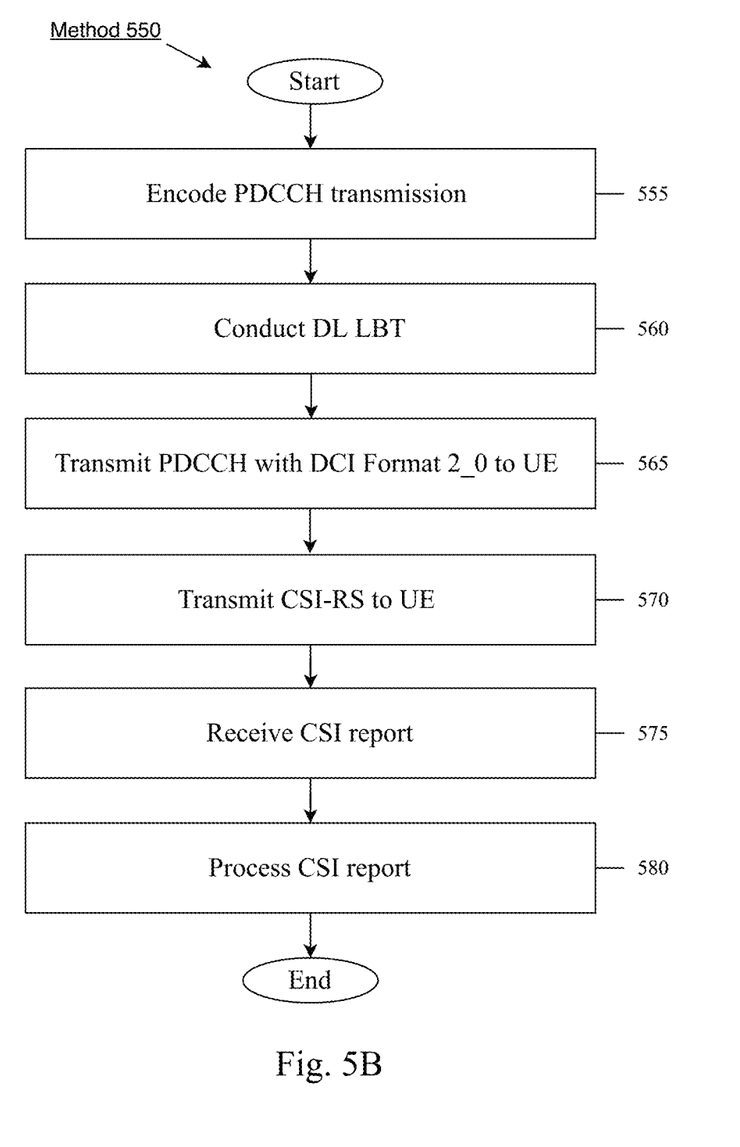
FIG. 5B shows a method of processing a CSI report at a gNB according to various exemplary embodiments.

FIG. 5B shows a method 550 related to CSI-RS or CSI-IM signaling by a gNB (e.g., gNB 120A). At 555, the gNB encodes a PDCCH transmission to include a DCI Format 2_0. The DCI Format 2_0 was described above and may include various information such as, for example, COT and slot form indication information element (IE). At 560, the gNB 120A conducts a DL LBT. In this example, it may be considered that the DL LBT succeeds. At 565, the gNB 120A transmits a PDCCH conveying DCI Format 2_0 to the UE 110. At 570, the gNB 120A transmits CSI-RS signals and the UE 110 measures the CSI-RS signals in accordance with the instructions provided in the DCI Format 2_0. The UE 110 performs the CSI measurements and generates a CSI report. At 575, the gNB 120A receives the CSI report corresponding to the CSI request state. At 580, the gNB 120A processes the CSI report to extract the CSI measurement.

Figure 6:
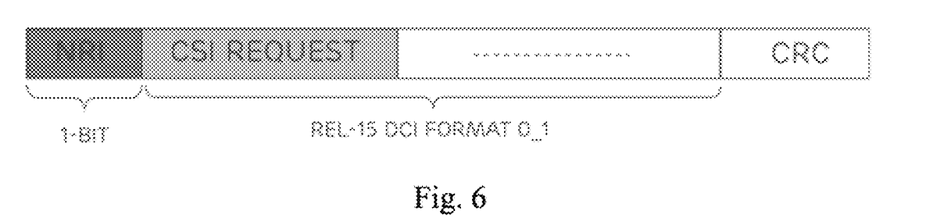
FIG. 6 shows a diagram of DCI Format 0_1 according to various exemplary embodiments.

FIG. 6 shows a diagram of DCI Format 0_1 according to various exemplary embodiments. In some embodiments, a new information element (IE) may be added to the DCI Format 0_1 to trigger aperiodic CSI feedback by the UE 110 in the PUSCH scheduled by this DCI format. In some embodiments, the IE may be a 1-bit "need retransmission indicator" (NRI) field added to the DCI Format 0_1 to indicate whether the corresponding CSI report triggered by the same CSI request field in the same DCI Format 0_1 is a new report or a retransmission of the latest report associated with the CSI request field.

In some embodiments, the NRI is binary. An NRI with a '0' value indicates that a new report is triggered and the corresponding CSI-RS may be transmitted for the CSI measurement. Alternatively, an NRI with a '1' value indicates that the aperiodic CSI (A-CSI) report corresponding to the CSI request field should be retransmitted, in which case there may be no CSI-RS resource provided for the CSI measurement because the CSI report will be a retransmission of a previously transmitted report for which measurements have already been performed.

In some embodiments, the NRI is either toggled or not toggled. When the NRI is toggled, the UE 110 conducts a new A-CSI measurement. Alternatively, when the NRI is not toggled, the UE 110 may retransmit the A-CSI report associated with the CSI request field of the previous DCI Format 0_1.

Figure 7:
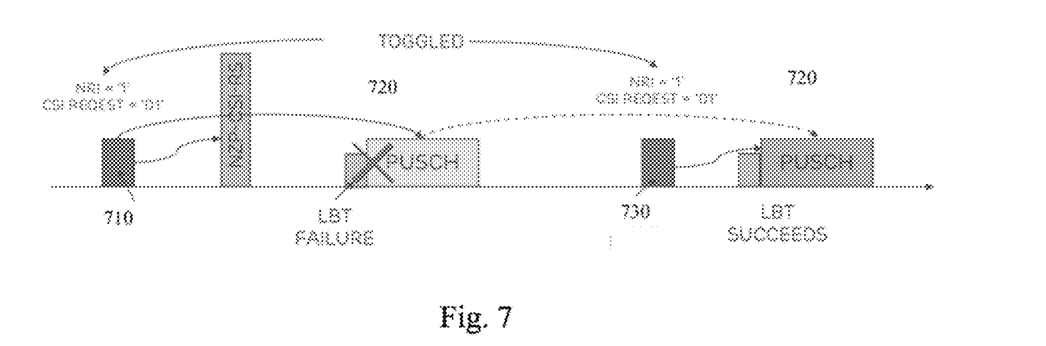
FIG. 7 shows a diagram illustrating an A-CSI report retransmission according to various exemplary embodiments.

FIG. 7 shows a diagram illustrating an A-CSI report retransmission according to various exemplary embodiments. FIG. 7 illustrates an operation in which the NRI discussed above is utilized. As illustrated in FIG. 7, the UE 110 receives a DCI Format 0_1 at 710, which triggers the UE 110 to perform CSI measurements. Because this would be a new measurement, the NRI is toggled (e.g., value of '1' assuming the previous NRI value is '0'). The DCI Format 0_1 triggers the UE 110 to utilize the NZP-CSI-RS resources and transmit a PUSCH that is scheduled by the DCI Format 0_1 that includes the CSI measurement 720. However, in this example, the LBT fails and thus, the UE 110 cannot transmit the CSI report 720 that is associated with CSI request state '01'. Subsequently, the gNB 122A sends another DCI Format 0_1 at 730 in which the NRI is not toggled (a value of '1') with the CSI request state field set to '01', triggering an A-CSI retransmission of the CSI measurement 720. As indicated in FIG. 7, the LBT succeeds and the UE 110 successfully retransmits the CSI measurement 720 in the PUSCH scheduled by the DCI Format 0_1 at 730. Thus, using the toggled NRI field in DCI Format 0_1 in the case of a retransmission, the gNB 122A does not need to transmit additional NZP-CSI-RSs, which saves overhead system resources and the UE 110 does not need to measure any additional NZP-CSI-RSs thereby saving battery power of the UE 110.

Figure 8:
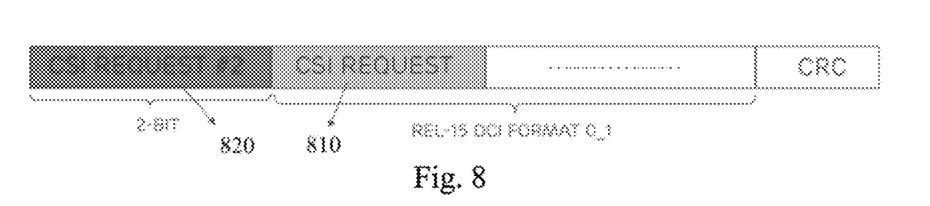
FIG. 8 shows a diagram of DCI Format 0_1 according to various exemplary embodiments.

FIG. 8 shows a diagram of DCI Format 0_1 according to various exemplary embodiments. In the embodiment of FIG. 8, a 2-bit CSI request #2 field 820 may be added to the existing CSI request field 810 of the DCI Format 0_1 to allow the simultaneous triggering of a new CSI report associated with one CSI request state and a retransmission of a different CSI report associated with a different CSI request state. For example, the 2-bit CSI request state may be set to '00' to indicate that no CSI report retransmission is triggered for the PUSCH scheduled by the corresponding DCI Format 0_1. Similarly, the 2-bit request state may be set to '01' to indicate that a new CSI report is triggered and a retransmission of a different CSI report associated with a different CSI is also triggered.

Figure 9:
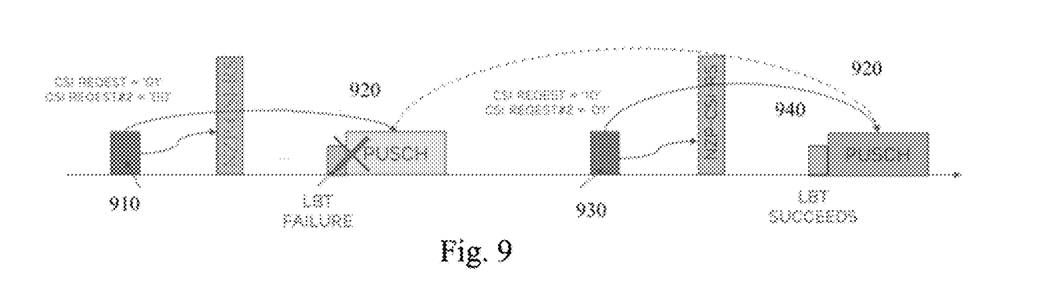
FIG. 9 shows a diagram illustrating an A-CSI report retransmission according to various exemplary embodiments.

FIG. 9 shows a diagram illustrating an A-CSI report retransmission according to various exemplary embodiments. FIG. 9 illustrates an operation in which the 2-bit CSI request state #2 discussed above is utilized. As illustrated in FIG. 9, the UE 110 receives a DCI Format 0_1 at 910, which triggers the UE 110 to perform a new CSI measurement. Because this would be a new measurement assuming no previous failed report transmissions, the value of the 2-bit CSI request #2 field is set to '00' and the 2-bit CSI Request value is set to '01.' This DCI Format 0_1 triggers the UE 110 to utilize the NZP-CSI-RS resource and transmit a PUSCH that is scheduled by the DCI Format 0_1 and includes the CSI measurement 920. However, because in this example the LBT fails, the UE 110 cannot transmit the CSI report 920.

Subsequently, the gNB 122A sends another DCI Format 0_1 at 930 in which the value of the 2-bit CSI Request #2 is set to '01' and the 2-bit CSI Request value is set to '10,' triggering an A-CSI retransmission of the CSI measurement 920 corresponding to the CSI request #2 of the DCI Format 0_1 at 910 as well as a new CSI measurement 940 corresponding to the CSI request of the DCI Format 0_1 at 930. As indicated in FIG. 9, the LBT succeeds and the UE 110 successfully retransmits the CSI measurement 920 as well as the CSI measurement 940, both in the PUSCH scheduled by the DCI Format 0_1 at 930. In some embodiments, the CSI measurement results 920 and 940 are concatenated and piggyback on PUSCH resources after the LBT success.

Figure 10:
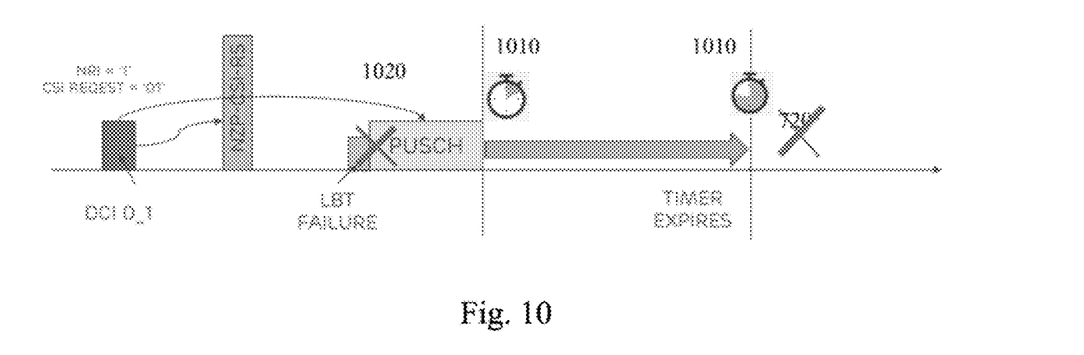
FIG. 10 shows a diagram illustrating an A-CSI report retransmission according to various exemplary embodiments.

FIG. 10 shows a diagram illustrating an A-CSI report retransmission according to various exemplary embodiments. In some embodiments, the UE 110 may be configured with a CSI validity timer 1010 by UE-specific dedicated RRC signaling corresponding to each CSI request state. Because CSI measurements may become obsolete after a certain period of time, the timer 1010 may be configured such that the UE discards a given CSI measurement after a predetermined period of time has expired. This scenario is particularly applicable when an LBT failure occurs.

In some embodiments, the timer 1010 duration is configured by the gNB 122A. For example, different frequency ranges may have different windows in which the CSI measurement is valid. In the case of a high-speed UE (e.g., an automobile), the window may be relatively small. If the timer 1010 expires, then there is no need to retransmit a CSI report that was not transmitted due to LBT failure. Instead, the UE will be triggered to conduct a new CSI measurement and the timer 1010 will be restarted for that measurement. As illustrated in FIG. 10, the DCI Format 0_1 triggers the UE 110 to utilize the NZP-CSI-RS resource and transmit a PUSCH that is scheduled by the DCI Format 0_1 and includes the CSI measurement 1020. However, because the LBT fails, the UE 110 cannot transmit the CSI report. In this example, the timer 1010 expires before a retransmission is triggered. As a result, the CSI measurement is no longer valid and the corresponding report will not be retransmitted.

Figure 11:
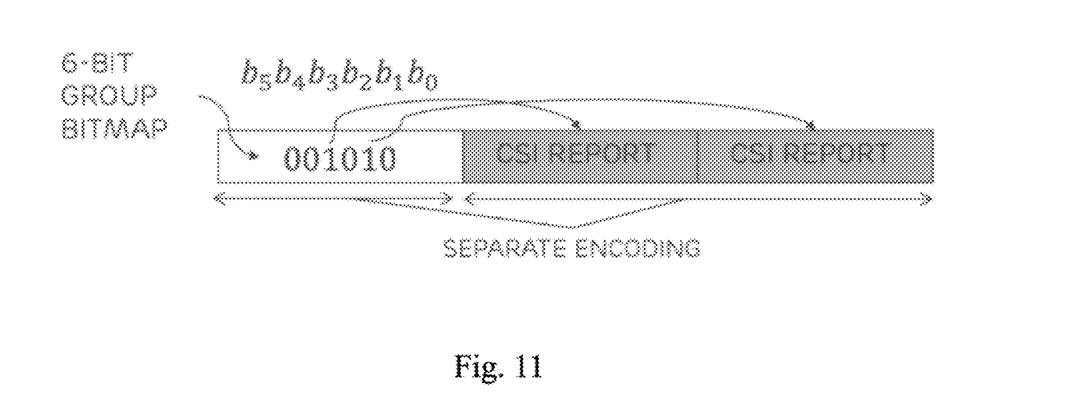
FIG. 11 shows a CG-PUSCH transmission according to various exemplary embodiments.
Figure 12:
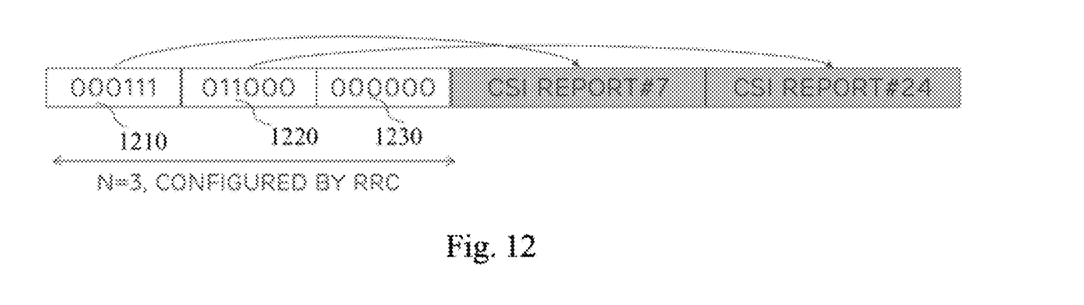
FIG. 12 shows a CG-PUSCH transmission according to various exemplary embodiments.

FIGS. 11 and 12 show a CG-PUSCH transmission according to various exemplary embodiments. In some embodiments, pending CSI reports that have not been transmitted due to failed LBT processes may be autonomously retransmitted over CG-PUSCH if a valid timer (e.g., valid time 1010) is still running for each of those reports. To avoid misalignment between the UE 110 and the gNB 122A regarding the number of CSI reports to be retransmitted on the CG-PUSCH, a CSI-request state group bitmap may be added to the CSI feedback payload (e.g., the CSI report(s)), as illustrated in FIG. 11. The bitmap may include N bits (e.g., 0, 1, . . . 6 bits), where N is the total number of groups into which the configured CSI request states for a given UE are divided. In some embodiments, the order of the bitmap is such that the CSI request state group indices are mapped in ascending order from the most significant bit (MSB) of the bitmap to the least significant bit (LSB). For each bit, a value of '1' indicates a CSI report retransmission for the corresponding group is included in the payload, whereas a value of '0' indicates that a CSI report retransmission is not included. The grouping of the CSI request state is configured by RRC for each UE. The CSI report for the latest valid CSI request state within a group is retransmitted if the group is included in the CG-PUSCH.

In some embodiments, separate channel coding schemes may be used for the bitmap and the payload due to the dependency of the payload on the number of groups. That is, the gNB 122A first decodes the bitmap to determine the payload size of the associated CSI reports. As shown in FIG. 11, assuming the UE 110 is configured with 6 CSI request state groups, the pending CSI reports that are associated with CSI request '000010' and '001000' are selected to be transmitted in the given CG-PUSCH transmission.

In other exemplary embodiments, as illustrated in FIG. 12, the total number of simultaneously retransmitted CSI request states may be configured by RRC signaling. As a result, the UE 110 determines which of the pending CSI reports are retransmitted in a CG-PUSCH occasion based on, for example, the time a given CSI report was generated, the content of the CSI report, the priority of the associated service type (e.g., one priority for Ultra Reliable and Low Latency Communication (URLLC) and another for Enhanced Mobile Broadband (EMBB)). However, it should be noted that these factors are examples and that other factors may be taken into consideration by the UE 110 when determining which of the pending CSI reports are retransmitted in a given CG-PUSCH. In this embodiment, a CSI request state of all zeroes (e.g., '000000') indicates the corresponding CSI request state is unused and no corresponding CSI report retransmission is included for that state.

In the example illustrated in FIG. 12, it is assumed that (1) the UE is configured with 64 CSI request states (with a corresponding CSI request state field of 6 bits), (2) the maximum total number of simultaneous retransmitted request states in a single PUSCH is 3 (which is configured by RRC signaling), and (3) the UE has decided to retransmit CSI request state 7 and CSI request state 24. The bits of the first field 1210 are '000111,' corresponding to CSI request state 7. The bits of the second field 1220 are '011000," corresponding to CSI request state 24. Since the UE has decided not to retransmit any other CSI request states, the bits of the third field 1230 are '000000,' which indicates to the gNB that no further CSI reports are included in the payload (besides the CSI reports corresponding to CSI request states 7 and 24).

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A non-transitory computer readable storage medium comprising a set of instructions, wherein the set of instructions when executed by a processor of a user equipment (UE) connected to a 5G new radio (NR) network on a frequency band in an unlicensed spectrum cause the processor to perform operations comprising:
receiving a downlink channel information (DCI) format 2_0 from a g-NodeB (gNB) connected to the 5G NR network, wherein the DCI format 2_0 includes channel occupancy time (COT) duration and a gap threshold value;
determining whether a nonzero power channel state information reference signal (NZP-CSI-RS) resource is valid,
wherein the determining whether the NZP-CSI-RS resource is valid includes at least determining whether the NZP-CSI-RS resource is within the COT duration.

2. The non-transitory computer readable storage medium of claim 1, wherein, if the NZP-CSI-RS resource is not valid, the operations further comprise:
determining if a subsequent NZP-CSI-RS resource is valid, wherein the subsequent NZP-CSI-RS resource is valid if the subsequent NZP-CSI-RS resource is within the COT duration and a second gap between the last symbol of the DCI format 2_0 and a first symbol of the subsequent NZP-CSI-RS resource is greater than the gap threshold value.

3. The non-transitory computer readable storage medium of claim 1, wherein, if the NZP-CSI-RS resource is valid, the operations further comprise:
receiving a DCI format 0_1 transmission from the gNB, wherein the DCI format 0_1 includes a CSI request;

conducting a CSI measurement in response to the CSI request;

generating a CSI report including the CSI measurement; and transmitting the CSI report to the gNB in a physical uplink shared channel (PUSCH).

4. The non-transitory computer readable storage medium of claim 3, wherein the DCI format 0_1 includes an additional field indicating (a) whether the CSI request triggers a retransmission of the CSI report corresponding to a CSI request state to the gNB or (b) whether the CSI request triggers generation of a new CSI report corresponding to the CSI request state and transmittal to the gNB.

5. The non-transitory computer readable storage medium of claim 4, wherein the additional field is a one-bit field including a Need Retransmission Indicator (NRI), wherein if the NRI is toggled, the CSI report corresponding to the CSI request state does not need to be retransmitted to the gNB, and if the NRI is not toggled, the CSI report corresponding to the CSI request state needs to be retransmitted to the gNB.

6. The non-transitory computer readable storage medium of claim 4, wherein the additional field is a 2-bit field indicating (a) whether the CSI request triggers a retransmission of the CSI report corresponding to a CSI request state to the gNB; and (b) whether the CSI request triggers generation of a new CSI report corresponding to the CSI request state and transmittal to the gNB.

7. The non-transitory computer readable storage medium of claim 4, wherein the UE includes a CSI validity timer defining a predetermined period of time during which the CSI report is valid and can be retransmitted if triggered by the gNB.

8. The non-transitory computer readable storage medium of claim 7, wherein retransmission of the CSI report is not performed if the predetermined period of time has expired.

9. The non-transitory computer readable storage medium of claim 4, wherein the retransmission occurs over configured grant PUSCH (CG-PUSCH).

10. The non-transitory computer readable storage medium of claim 9, wherein the retransmission includes at least one field including a plurality of bits identifying which CSI reports are included in a payload of the retransmission.

11. A user equipment (UE) connected to a 5G new radio (NR) network on a frequency band in an unlicensed spectrum, the UE comprising:
a processor configured to:
receive a downlink channel information (DCI) format 2_0 from a g-nodeB (gNB) connected to the 5G NR network, wherein the DCI format 2_0 includes channel occupancy time (COT) duration and a gap threshold value;
determine whether a nonzero power channel state information reference signal (NZP-CSI-RS) resource is valid,
wherein the determining whether the NZP-CSI-RS resource is valid includes at least determining whether the NZP-CSI-RS resource is within the COT duration.

12. The UE of claim 11, wherein, if the NZP-CSI-RS resource is not valid, the processor is further configured to:
determine if a subsequent NZP-CSI-RS resource is valid, wherein the subsequent NZP-CSI-RS resource is valid if the subsequent NZP-CSI-RS resource is within the COT duration and a second gap between the last symbol of the DCI format 2_0 and a first symbol of the subsequent NZP-CSI-RS resource is greater than the gap threshold value.

13. The UE of claim 11, wherein, if the NZP-CSI-RS resource is valid, the processor is further configured to receive a DCI format 0_1 transmission from the gNB, wherein the DCI format 0_1 includes a CSI request; conduct a CSI measurement in response to the CSI request; and generate a CSI report including the CSI measurement; wherein the UE further comprises:
a transceiver configured to transmit the CSI report to the gNB in a physical uplink shared channel (PUSCH).

14. The UE of claim 13, wherein the DCI format 0_1 includes an additional field indicating (a) whether the CSI request triggers a retransmission of the CSI report corresponding to a CSI request state to the gNB or (b) whether the CSI request triggers generation of a new CSI report corresponding to the CSI request state and transmittal to the gNB.

15. The UE of claim 14, wherein the additional field is a one-bit field including a Need Retransmission Indicator (NRI), wherein if the NRI is toggled, the CSI report corresponding to the CSI request state does not need to be retransmitted to the gNB, and if the NRI is not toggled, the CSI report corresponding to the CSI request state needs to be retransmitted to the gNB.

16. The UE of claim 14, wherein the additional field is a 2-bit field indicating (a) whether the CSI request triggers a retransmission of the CSI report corresponding to the CSI request state to the gNB; and (b) whether the CSI request triggers generation of a new CSI report corresponding to the CSI request state and transmittal to the gNB.

17. The UE of claim 14, wherein the UE further comprises:
a CSI validity timer defining a predetermined period of time during which the CSI report is valid and can be retransmitted if triggered by the gNB.

18. The UE of claim 17, wherein retransmission of the CSI report is not performed if the predetermined period of time has expired.

19. The UE of claim 14, wherein the retransmission occurs over configured grant PUSCH (CG-PUSCH).

20. The UE of claim 19, wherein the retransmission includes at least one field including a plurality of bits identifying which CSI reports are included in a payload of the retransmission.

* * * * *